United States Patent [19]
Colodney et al.

[11] 3,929,987
[45] *Dec. 30, 1975

[54] TOOTHPASTE

[75] Inventors: Daniel Colodney, Bridgwater; Martin Cordon, Highland Park, both of N.J.

[73] Assignee: Colgate-Palmolive Company, New York, N.Y.

[ * ] Notice: The portion of the term of this patent subsequent to Jan. 16, 1990, has been disclaimed.

[22] Filed: Feb. 21, 1974

[21] Appl. No.: 444,476

Related U.S. Application Data

[62] Division of Ser. No. 268,908, July 3, 1972, abandoned.

[52] U.S. Cl.................................... 424/52; 424/49
[51] Int. Cl.².............................................. A61K 7/18
[58] Field of Search........ 424/6, 7, 49- 58; 106/288; 260/37

[56] References Cited
UNITED STATES PATENTS

| | | | |
|---|---|---|---|
| 2,984,570 | 5/1961 | Prell | 99/148 |
| 3,516,941 | 6/1970 | Matson | 252/316 |
| 3,574,823 | 4/1971 | Roberts et al. | 424/49 |
| 3,585,149 | 6/1971 | Vassiliades et al. | 252/316 |
| 3,711,604 | 1/1973 | Colodney et al. | 424/52 |
| 3,767,791 | 10/1973 | Cordon et al. | 424/49 |
| 3,803,301 | 4/1974 | Cordon et al. | 424/49 |

FOREIGN PATENTS OR APPLICATIONS

| | | |
|---|---|---|
| 2,031,676 | 6/1970 | Germany |

OTHER PUBLICATIONS

Chem. Abst. 70 No. 71092n (1969) Watson.
Chem. Abst., 74 No. 79581z (1971) Shaffer.
Chem. Abst., 78 No. 62073v (1973) Patino et al.

*Primary Examiner*—Shep K. Rose
*Attorney, Agent, or Firm*—Kenneth A. Koch; Herbert S. Sylvester, Esq.; Murray M. Grill, Esq.

[57] ABSTRACT

Toothpaste formulations containing macroscopically visible particles are disclosed. The toothpaste formulations include a transparent, translucent or opaque toothpaste base having dispersed therein macroscopically visible particles including a functional component effective in performing oral hygiene and a binding agent.

6 Claims, No Drawings

TOOTHPASTE

This is a division, of application Ser. No. 268,908 filed July 3, 1972, now abandoned.

The invention relates to toothpaste formulations containing dispersed particles or speckles that are visible to the unaided eye. More specifically, the invention provides a transparent, translucent or opaque toothpaste having dispersed therein macroscopically visible particles including a functional component effective in promoting oral hygiene, preferably an active ingredient having anticaries or antimicrobial properties or the like in combination with a binder. For visual effect, the particles or speckles can contrast with the toothpaste base to provide aesthetically pleasing characteristics. Polishing agents may also be present in the particles to provide improved cleaning characteristics.

In accordance with the present invention, a toothpaste formulation including a functional ingredient as defined herein is provided. The functional ingredient is incorporated into the formulation in the form of aesthetically attractive macroscopically visible particles or speckles that are dispersed in a minor amount sufficient to give an attractive speckled-type appearance, usually from about 0.1 percent to about 10 percent by weight, and preferably between about 1 and 5 percent by weight throughout the toothpaste base. Advantageously, the dispersed particles or speckles comprise subparticles of the functional ingredient joined together by a binding agent permitting the active ingredient to be released upon toothbrushing.

The term "functional ingredient" or "component" describes a material effective in promoting hygiene in the oral cavity, particularly by having a beneficial effect upon the dentition (which includes the teeth and its surrounding or adjacent elements or structures including the plaque and calculus on teeth, gingiva, mucous membranes and the saliva around the teeth) by reason of its chemical or biological-type effects as distinguished from an essentially abrasive material operating by substantially mechanical or physical cleaning effects. Such materials may operate by various mechanisms depending on the materials such as by possible insolubilization of enamel, anti-bacterial effect, enzyme-inhibition, acid-neutralizing power, de-sensitization, inhibition or reduction of stain, and so forth.

In a special aspect, the functional component of the speckles is particularly an anticaries agent. Examples of dentally effective fluorine-containing substances include inorganic and organic fluorine-containing materials, preferably fluoride salts. Suitable inorganic fluorides include sodium fluoride, stannous fluoride, potassium fluoride, indium fluoride, potassium stannous fluoride ($SnF_2$—KF), potassium fluorozirconate, sodium hexafluorostannate, stannous chlorofluoride, and sodium monofluorophosphate. Organic fluorine compounds such as amine hydrofluorides may so be used such as laurylamine hydrofluoride, cetylpyridinium fluoride, etc.

The function of a fluorine-containing ingredient is to provide a beneficial effect on the care and hygiene of the teeth by reducing the solubility of enamel tissue in acid environment and to protect the teeth against decay. The foregoing fluorine materials which dissociate or release fluorine-containing ions, suitably may be present in an effective but non-toxic amount, usually within the range of about 0.01 to 1 percent by weight of the water-soluble fluorine content thereof. Typically, the amount of fluorine-containing substance in the new speckles is not critical, usually between 10 and 30 percent by weight though lesser and greater proportions can be used, and of course, depends on the concentration of the speckles in the dental cream. For example, to yield 0.1 percent by weight of water-soluble fluoride ions in the final toothpaste, with a speckle concentration of about 2 percent by weight, the speckles should comprise about 20 percent by weight of stannous fluoride $SnF_2$.

Antimicrobial agents are incorporated into toothpaste formulations to promote oral hygiene, and generally may be effective by reducing dental plaque, improving gingival conditions, inhibiting the formation of dental calculus, or reducing or modifying the number or type of micro-organisms. Representative antimicrobial agents include cationics and particularly the biguanide materials including:

$N^1$-(4-chlorobenzyl)-$N^5$-(2,4-dichlorobenzyl) biguanide;
p-chlorophenyl biguanide;
4-chlorobenzyhydrylguanylurea;
N-3-lauroxypropyl-$N^5$-p-chlorobenzylbiguanide;
1-(lauryldimethylammonium)-8-(p-chlorobenzyldimethylammonium)octane dichloride;
5,6-dichloro-q-guanidinobenzimidazole;
$N^1$-p-chlorophenyl-$N^5$-laurylbiguanide;
1,6-di-p-chlorophenyl biguanidohexane;
1,6-bis(2,ethylhexyl biguanido)hexane;
5-amino-1, 3-bis(2-ethylhexyl)-5-methylhexahydropyrimidine;

and their non-toxic acid addition salts such as chloride, bromides, methosulfates.

Additional antimicrobial agents useful in the invention are quaternary ammonium carbamate, thiocarbamate, dithiocarbamate and carbamide compounds such as those disclosed in U.S. Pat. No. 3,621,048; and the dichloro-2-guanidino benzimidazoles disclosed in U.S. Pat. No. 3,523,154 and imidazoles of U.S. Pat. No. 3,497,591.

Other active ingredients which may be used in suitable amount include ammoniated materials such as urea and diammonium phosphate; water-soluble chlorophyllines; vitamins such as Vitamin $B_6$, $B_{12}$ complex or Vitamin E; de-sensitizing materials such as strontium salts, e.g., strontium chloride; antibiotics such as tyrothricin, vancomycin, tylosin, desmycosin and the macrolides of U.S. Pat. No. 3,342,687; prostaglandins; enzymes such as dextranase and enzyme products having a neutral protease activity of at least about 700,000 to 2 million casein units of activity per gram and derived from B. subtillus; phenols; hexachlorophene; optical brighteners such as 4-methyl-7-hydroxy or 4 methyl-7-diethylamine coumarin; astringents such as zinc chloride, zinc sulphate, aluminum lactate, etc.

Among the active ingredients are included materials which tend to freshen the breath such as flavoring oils, e.g. peppermint oil and others described herein, and sweetening agents such as saccharin, sodium cyclamate, and so forth.

In addition to an attractive appearance, the incorporation of such active ingredients in bound or bonded form so as to form speckles may have various advantages depending on the specific materials in the formulation. Certain materials may be impaired in effectiveness or amount or tend to be reactive with other materials in the toothpaste base or upon aging, and their inclusion as speckles tends to keep them isolated and permits greater latitude in formulation of the base; the addition of these materials to the toothpaste can be better controlled when added as speckles or granules; the bound speckles with a suitable binder permits satisfactory stability or integrity of the speckles even where water-soluble active ingredients are present, and upon toothbrushing said speckles are dissolved, solubilized or smeared so as to permit release of desired effects obtained from the functional ingredients.

Subparticles of the functional component having a diameter usually below 40 microns, typically between 1 and 20 microns, can comprise any suitable amount, such as from about 1 to 99 percent, particularly 5 to 50 percent, of the macroscopically visible speckles, depending on the particular active ingredient. In addition to a functional ingredient (including mixtures) and suitable binding agent, the speckles can also include coloring agents, depending on the specific characteristics desired in the final formulation.

The binding agent portion of the macroscopically visible particles or speckles may be any material suitable as a binder and will be selected to be compatible with the active ingredient, so as to form a stable speckle or agglomerate. In particular, water-insoluble binders including one or more of thermoplastic materials, resins, gums, gels, paraffins, waxes, polymers, higher fatty acids and salts thereof such as stearic acid, magnesium stearate, calcium stearate, and the like can be used.

A preferred group of binders in accordance with this aspect of the invention are water-insoluble, natural and synthetic materials classified as thermoplastic, i.e., materials that soften and are rendered moldable when heated. Representative of this latter group are polymers, particularly ethyleneically unsaturated polymers such as polyethylene, polyvinyl chloride, polyvinyl acetate, copolymers of polyvinyl chloride and vinyl alcohol, vinyl acetate and vinylidene chloride, polystyrene, polymethylstyrene; synthetic rubbers such as styrenebutadiene copolymers and copolymers of alpha methyl styrene and vinyl toluene; polymethacrylates, such as polymethyl methacrylate, polyethyl methacrylate, polyisopropyl methacrylate, polyisobutyl methacrylate; polyacrylates; polyamides such as nylon; cellulosics such as acetates and butyrates; polycarbonates; phenoxys such as polymers of bisphenol-A and epichlorohydrin; polymers of monomers containing at least 2 polymerizable groups that are initially rendered moldable when heated and subsequently harden when heating is continued, such as polyallyl methacrylate and the polymers of the di-esters of methacrylic acid and ethylene glycol; courmarone-indene resins, paraffin and waxes including natural waxes such as carnauba, and mixtures of the foregoing materials.

An advantage of water-insoluble binders is maximum stability of the particles in the toothpaste, and are particularly desirable when combined with water-soluble active ingredients as well as water-insoluble components. In dispensing the toothpaste the particles do not streak but remain distinct and sparkling. Surprisingly, even though the particles are of macroscopically visible size, they are substantially impalpable in the mouth during brushing.

Particularly advantageous results can be obtained in preparing functional speckles by utilizing a water-insoluble thermoplastic binding agent having a molecular weight between about 500 and about 20,000, preferably at least about 1,000. The hardness, expressed as tenths of mm needle penetration (100 grams/5sec/25°C., ASTM D1321), of preferred materials in this class is typically between about 1 and 15 although harder grades can be used if not objectionable in the final toothpaste. The following table lists the properties of thermoplastic binding agents representative of this preferred class.

| Resin | A.M.W.[1] | S.P.[2] Approx. | Hardness | S.G.[4] | A.V. | CP[5] |
|---|---|---|---|---|---|---|
| polyethylene[6] | 2,000 | 105°C. | 3.5 | 0.92 | 200 | (140°c.) |
| polyethylene[6] | 2,200 | 107°C. | 3.0 | 0.92 | 220 | " |
| polyethylene[6] | 3,500 | 116°C. | 1.0 | 0.93 | 350 | " |
| polyethylene[6] | 5,000 | 109°C. | 2.5 | 0.92 | 4000 | " |
| polyethylene[6] | 1,500 | 102°C. | 7.5 | 0.91 | 145 | " |
| polyethylene[6] | 1,100 | 195°C. | 80.0 | 0.89 | 40 | " |
| polyethylene[6] | 2,000 | 96°C. | 9.5 | 0.91 | 230 | " |
| polyethylene[6] | 3,500 | 204°C. | 7.0 | 0.92 | 500 | " |
| oxidized polyethylene[7] | 1,800 | 104°C. | 4.0 | 0.94 | 320 | (125°C.) |
| oxidized polyethylene[7] | 3,000 | 106°C. | 3.0 | 0.94 | 1200 | " |
| Polyamide[8] | 6,000 | | | | | |
| Polyamide[8] | 9,000 | 110°C. | 4.0 | 0.98 | 2200 | " |
| Polamide[8] | 9,000 | 95°C. | 15.0 | 0.09 | 110 | " |
| Polyamide[8] | 9,000 | 110°C. | 3.0 | 0.98 | 3800 | " |
| Ams-vtcp[9] | 1,000 | 100°C. | — | — | 3500 | (140°C.) |

[1]Average Molecular Weight
[2]Softening Point (Approx.) ASTM E-28
[3]0.1 mm needle penetration ASTM D-132 (100 grams/5 sec/25°C.)
[4] Specific Gravity
[5]Average Viscosity CP
[6]Available from Allied Chemical Company under the trademark A-C polyethylene grades 6, 6A, 7, 7A, 8, 8A, 615, 617, 617A, G-201 and 400.
[7]Available from Eastman Chemical Products, Kingsport, Tennessee under the trademark EPOLENE. These materials are emulsifiable and have both an acid value and saponification number of 9-10. Similar materials are avialable from Allied Chemical Company under the trademark A-C polyethylene grades 656, 629, 655 and 680.
[8]Produced from ethylene diamine in accordance with U.S. Patent number 2,370,413. Available from the Chemical Division of General Mills Co., Kankakee, Illinois under the trademark Versamid grades 930, 940 and 950.
[9]Alpha methyl styrene-vinyl toluene copolymer, available from Picco Resin Company, Clairton, Pennsylvania under the trademark Piccotex 100.

All of the foregoing water-insoluble binders may be used as well as other binders such as water-soluble materials including gum acacia(arabic), gelatins, starches, alkali metal carboxymethyl celluloses, polyethylene glycols, glucose, sucrose, methylcellulose, carboxyethyl hydroxymethyl celluloses, sodium alginate, polyvinyl pyrrolidone, polyvinyl alcohol, Irish Moss, gum tragacanth, magnesium aluminum silicate gel, and the like, as well as compatible mixtures of the binding agents.

The foregoing binding materials are non-toxic and do not adversely affect the material from which the packaging tube for the toothpaste may be constructed (usually aluminum, lead or a laminated plastic material).

Various methods of forming functional subparticles into visible speckles are contemplated by the invention. One method comprises dry blending the binding agent in powder form with the functional subparticles, optionally with a suitable coloring agent, if desired. The dry mixture is then placed in a heating apparatus and uniformly heated and mixed until the binding agent material softens and begins to agglomerate. A suitable heating apparatus should provide substantially uniform heat to the dry mixture to avoid hot spots and actual melting of the binding agent material. Representative of suitable heating apparatus are heated fluidized sand baths and oil baths.

When the mass of subparticles and binding agent material begins to agglomerate, i.e., before the binding agent becomes molten, it is removed from the heat source and cooled to a temperature below the softening point of the binding agent while still being mixed. The cooled mass is then ground to particulate form in a suitable apparatus such as a ball or hammer mill. Solid carbon dioxide can be added during the grinding step in order to prevent the temperature from rising above the softening point of the binding agent material from the heat generated during grinding. The resulting particles typically are irregularly shaped. The desired size particles are isolated by screening the particulate material through appropriate sieve screens. Generally, the portion of the particulate material passing through a 20 mesh (U.S. sieve series) and retained by a 60 or 80 mesh screen (U.S. sieve series) is preferred for use in accordance with the invention.

Another process comprises heating the thermoplastic binding agent until molten and uniformly blending the subparticles into the molten mass. The molten mass can be subsequently solidified by cooling, subjected to grinding, and screened to isolate the desired size range. This technique is advantageous to use with binding agent materials having a sharp melting point such as carnauba wax and paraffin.

The agglomerated particles produced by the foregoing procedures are usually irregularly shaped and have a mean particle size between about 177 and 840 microns. Of course, any segment of this size range of particles can be further isolated for a particular application. Particles having a mean particle diameter between about 250 and 420 microns are particularly advantageous.

Alternative methods and binding agents can be used to make visible particles including functional subparticles in accordance with the invention. For example, direct compression techniques well known in the tableting art may be utilized. Suitable binding agents for forming functional particles by the direct compression technique include gums such as gum acacia and gum tragacanth, gelatins, starches and polyethylene glycols as well as the insoluble materials disclosed hereinabove. In the direct compression method for forming particles, a mixture of binding agent and subparticles of the functional ingredients are compressed in a tableting press to produce a tablet. The tablet is subsequently broken down in a suitable grinding apparatus and screened to recover the desired range of particle sizes.

Suitable particles can be produced by a wet granulation process wherein the subparticles of the functional ingredient are wetted with solvent solution of a suitable binding agent to form a wet mass which is subsequently forced through a screen having the desired size openings. The wet particles formed are then dried by air or in an oven and further screened to isolate a specific size range. The wet granulation procedure can be used by itself or in combination with direct compression to form a tablet which can be subsequently broken down and screened to isolate particles in the desired size range.

As previously mentioned, the new speckles can contrast with the toothpaste base to provide a speckled effect. If white speckles are desired, titanium dioxide can be included in the speckles. Titanium dioxide can be present in the speckles in an optional amount ranging from about 0.1 to 10 percent by weight.

The macroscopically visible particles of the invention can be colored to contrast with the toothpaste base. Typically, about 0.1 to 10 percent, preferably more than 1 percent by weight, of coloring agent is incorporated into the particles. In accordance with one aspect of the invention, pigments such as the metallic lakes of suitable dyes can be used to color the macroscopically visible, functional particles of the invention. A pigment is generally defined as a finely powdered insoluble colored material that is dispersed and suspended, as opposed to being dissolved, in the medium to be colored. The pigment may be entirely of a single insoluble colored material (such as ultramarine blue) or it may be composed of a combination of a water-soluble dye and a water-insoluble carrier to which the dye is bound. Typical of the latter materials are the well known "lakes" wherein the carrier material is a metallic oxide such as alumina.

Since the colored particles of the invention are used in dental cream formulations, the pigments utilized should be suitable for use in the oral cavity. Suitable pigments include ultramarine blues and pinks, cosmetic green oxide, cosmetic red oxide, carbon black, ferric oxides, pigment red No. 5 color index 12490, pigment blue No. 27 color index 77510, and pigment green No. 7 color index 74260. Further suitable pigments are those referred to in the U.S. as FD & C (food drug and cosmetics) and D & C (drugs and cosmetics) approved pigments. Typical of pigments of this type are metallic lakes of the following D & C dyes:

| Color | Color Index No. |
| --- | --- |
| Green No. 5 | 61570 |
| Green No. 6 | 61565 |
| Green No. 8 | 59040 |
| Yellow No. 10 | 47005 |
| Red No. 6 | 15850 |
| Red No. 7 | 15850 |
| Red No. 8 | 15585 |
| Red No. 9 | 15585 |
| Red No. 10 | 15630 |
| Red No. 11 | 15630 |
| Red No. 12 | 15630 |
| Red No. 13 | 15630 |
| Red No. 19 | 45170 |
| Red No. 21 | 45380A |
| Red No. 22 | 45380 |
| Red No. 27 | 45410 |
| Red No. 28 | 45410 |
| Red No. 30 | 73360 |
| Red No. 33 | 17200 |
| Red No. 34 | 15880 |
| Red No. 36 | 12085 |
| Red No. 37 | 45170B |
| Orange No. 5 | 45370A |
| Orange No. 10 | 45425A |

| Color | Color Index No. |
| --- | --- |
| Orange No. 11 | 4542Na |
| Orange No. 17 | 12075 |
| Blue No. 1 | 42090 |
| Blue No. 4 | 42090 |
| Blue No. 6 | 73000 |
| Blue No. 9 | 69825 |

To be most effective in cleaning the teeth, a polishing agent or abrasive ingredient should be included in the toothpaste formulation. The polishing agent can be incorporated into the toothpaste base or, in accordance with the invention, in the speckles. Of course, polishing agent may be present both in the toothpaste base and the speckles.

In further accordance with the invention, polishing material is selected amounts, usually up to about 80 percent by weight, preferably between 10 and 50 percent by weight of the visible particles can comprise subparticles of polishing agent. Suitable abrasive subparticles should preferably have a Mohs hardness of at least 2 and a particle size between about 0.1 and 50 microns although larger particles could be used successfully depending on their feel in the mouth. Representative of those suitable materials having a Mohs hardness rating in the range of 2–5 include insoluble phosphate salts such as insoluble sodium or potassium metaphosphate, calcium pyrophosphate, magnesium orthophosphate, tricalcium phosphate, dicalcium phosphate dihydrate, anhydrous dicalcium phosphate and the like. Suitable hard abrasive materials having a Mohs hardness rating of at least 5 and a particle size less than about 10 microns include zirconium silicate ($ZrSiO_4$), silica (sand, quartz), ground glass, calcium silicate, silicon carbide(grit), pumice, alumina, ilmenite ($FeTiO_3$), $CeO_2$, $Fe_2O_3$, (hematite), $SnO_2$, Topaz (aluminum hydroxy fluoro silicate), and $TiO_2$. Any of the many other mineral substances, such as hard silicate minerals, found in nature or manufactured, which have the foregoing specified hardness and particle size requirements, can be used in accordance with the invention. Visible particles in accordance with the invention containing subparticles of zirconium silicate as the hard abrasive material have been found to provide a particularly advantageous cosmetic effect with no undesirable increase in dentin abrasion and are preferred.

Toothpastes that are visually clear, i.e. transparent or translucent, are attractive to the consumer. However, incorporation into formulations of this type of functional ingredients, such as the fluoride salts, antimicrobial agents, etc. contemplated by the invention, can result in an upsetting of the optical balance and a conversion of the material from clear to opaque or a change in the intensity of the color of the base.

In accordance with one aspect of the invention functional ingredients that may adversely affect certain clear gel toothpaste, such as stannous fluoride and certain antimicrobial compounds can be incorporated into such formulations without any significant change in transparency or color, by providing the formulation with macroscopically visible particles containing the functional ingredient.

The toothpaste base includes liquids and solids that are proportioned to form a creamy mass of desired consistency which is extrudable from an aerosol container or a collapsible tube(whose walls are for example fabricated from aluminum or lead or a plastic laminated material) or a squeeze container or pourable as a mucilaginous type liquid designed to be used in conjunction with a toothbrush. In general, the liquids in the dental cream will comprise chiefly water, and water-soluble, non-volatile liquids such as humectants, e.g., glycerine, aqueous solutions of sorbitol, propylene glycol, polyethylene glycol 400, etc., including suitable mixtures thereof. It is advantageous usually to use a mixture of both water and a humectant or binder such as glycerine or sorbitol. The total liquid content will generally be about 20 to 75 percent by weight of the formulation. It is preferred to use also a gelling agent in dental creams such as the natural and synthetic gums and gum-like materials, for example, Irish moss, gum tragacanth, methyl cellulose, polyvinylpyrolidone, and starch usually in an amount up to about 10 percent, preferably about 0.2 to 5 percent, by weight of the formulation. Inorganic gelling agents can be employed, such as synthetic silicated clays having the formula

and available under the trademark Laponite CP and Laponite SP. The synthetic silicated clays are particularly suitable for use in formulating a transparent toothpaste base.

As previously indicated, the toothpaste base typically includes a dentally acceptable polishing agent of the type employed in dental creams. Representative polishing agents include, for example, dicalcium phosphate, tricalcium phosphate, insoluble sodium metaphosphate, aluminum hydroxide including hydrated alumina, colloidal silica, magnesium carbonate, calcium carbonate, calcium pyrophosphate, bentonite, etc. including suitable mixtures thereof. It is preferred to use the water-insoluble phosphate salts as the polishing agent and more particularly insoluble sodium metaphosphate and/or a calcium phosphate such as dicalcium phosphate dihydrate.

When the toothpaste is to be visually clear, a polishing agent having a refractive index about the same as the refractive index of the gel base, i.e., from about 1.4 to 1.5, can be used. Suitable polishing agents for use in clear toothpaste bases are amorphous silica, such as the silica xerogels and alkali metal aluminosilicate complexes. The foregoing polishing agents all have a refractive index between about 1.44 and 1.48 and are substantially invisible when incorporated into a clear gel toothpaste base. The polishing agent is generally present in amounts from about 20 to 75 percent by weight. In a visually clear base the amount of polishing agent is generally from about 5 to 50 percent by weight.

Silica xerogels are synthetic, aggregated, amorphous, porous silica materials having an average particle diameter of between about 2 and 20 microns, preferably between about 3 and 15 microns, and, preferably, a surface area of at least about 300, and up to about 600 to 800 square meters per gram. A suitable silica xerogel is available from Grace Davison Chemical Company under the trademarks Syloid 63, 72 and 74.

Other suitable silica materials are available from the Monsanto Chemical Company under the trademark Santocel and Santocel 100.

The abrasive material used in the clear gel vehicle of the toothpaste formulations of the invention can be a water-insoluble complex metallic salt of aluminosilicate having a refractive index close to that of the gel vehicle. Representative of such materials are synthetic amorphous complex aluminosilicate salts of an alkali metal or alkaline earth metal in which silica is interbonded with alumina and which contains up to 3.3% by weight of the polishing agent of alumina, and in which the mole ratio of silica to alumina is at least about 45:1. The foregoing aluminosilicate abrasives have a refractive index between about 1.44 – 1.47 and include up to about 20 percent by weight of moisture and up to about 10 percent by weight of alkali metal or alkaline earth metal oxide.

The complex aluminosilicate salt described above is typically a sodium or calcium salt, and forms a particularly desirable product. It is an amorphous powder which further has the property of being invisible when incorporated in a clear gel dental vehicle. Thus, a suitable particle size for the polishing ingredient is up to about 40 microns, preferably about 1 – 20 microns. The typical moisture content, measured by loss on ignition is about 5 – 20 percent by weight of the polishing ingredient and the typical content of alkali metal oxide such as sodium oxide or alkaline earth metal oxide such as calcium oxide is up to about 10 percent, generally about 0.3 – 2 percent by weight. Typically, the agent has a loose bulk density of up to about 0.2g/cc, preferably about 0.07 – 0.12g/cc.

Organic surface-active agents are used in toothpaste compositions to assist in achieving thorough and complete dispersion of the composition throughout the oral cavity and to render them more cosmetically acceptable. The organic surface-active material may be anionic, nonionic, ampholytic, or cationic in nature, and it is preferred to employ as the surface-active agent a detersive material which imparts to the composition detersive and foaming properties. Suitable such detergents are water-soluble salts of higher fatty acid monoglyceride monosulfonates, such as the sodium salt of the monosulfonated monoglyceride of hydrogenated coconut oil fatty acids, higher alkyl sulfates, such as sodium lauryl sulfate, alkyl aryl sulfonates, such as sodium dodecyl benzene sulfonate, higher alkyl sulfoacetates, higher fatty acid ester of 1,2 dihydroxy propane sulfonates, and the substantially saturated higher aliphatic acyl amides of lower aliphatic amino carboxylic acid compounds, such as those having 12 to 16 carbon atoms in the fatty acid, alkyl, or acyl radicals, and the like, and combinations of any of the foregoing materials, Examples of the last mentioned amides are N-lauroyl sarcosine, and the sodium, potassium, and ethanol-amine salts of N-lauroyl, N-myristoyl, or N-palmitoyl sarcosine. The use of these sarcosinate compounds in dentifrice compositions is particularly advantageous since these materials exhibit a prolonged and marked effect in the inhibition of acid formation in the oral cavity due to carbohydrate breakdown in addition to exerting some reduction in the solubility of tooth enamel in acid solutions. Preferably they are substantially free from soap or similar higher fatty acid material which tends to reduce their effect.

Other particularly suitable surface-active materials include nonionic agents such as condensates of sorbitan monostearate with approximately 60 moles of ethylene oxide, condensates of ethylene oxide with propylene oxide, condensates of propylene glycol("Pluronics") and amphoteric agents such as quaternized imidazole derivatives which are available under the trademark "Miranol" such as Miranol C₂M.

Various other materials may be incorporated in the opaque and clear toothpaste formulations of this invention. Examples thereof are coloring or whitening agents or dyestuffs, including water soluble dyes such as FD & C and D & C colors, preservatives, silicones, chlorophyll compounds, ammoniated materials such as urea, diammoniumphosphate and mixtures thereof, and other constituents. These adjuvants are incorporated in the formulation in amounts which do not substantially adversely affect the properties and characteristics desired and are selected and used in proper amount depending upon the particular type of preparation involved.

Synthetic finely divided silica such as pyrogenic silicas sold under the trademark Cab-O-Sil M-5; and other silicas such as Syloid 266, and Aerosil D-200, which may be employed as a thickening agent, may also be employed in amounts of about 1 – 5 percent by weight, particularly to promote thickening or gelling and to improve clarity of the dentifrice.

The taste of the toothpaste formulations may be modified by employing suitable flavoring or sweetening materials. Examples of suitable flavoring constituents include the flavoring oils, e.g. oils of spearmint, peppermint, cinnamon, lemon and orange as well as sodium methylsalicylate. Suitable sweetening agents include sucrose, lactose, maltose, sorbitol, sodium cyclamate, perillartine and saccharine. Suitably, flavor and sweetening agent may together comprise from about 0.01 to 5 percent or more of the compositions of the invention.

In addition to the functional ingredients incorporated into the new visible particles, the toothpaste base may also include similar ingredients if the characteristics of the base would not be adversely affected. For example, opaque toothpastes can include a portion of the fluoride salt or antimicrobial agent directly in the toothpaste base. The total amount of functional ingredient in the formulation, however, should be less than about 5 percent by weight of the formulation for antimicrobial agents and less than about 1 percent, based on the water-soluble fluorine content thereof, for fluoride compounds. Preferably the functional ingredient concentration in the new formulations should be from about 0.1 to 1 or 2 percent by weight.

It is desirable to adjust the pH of the dental cream formulations to the range of about 3 to 9 using such acids as citric, acetic, chloropropionic, malonic, formic, fumaric, methoxyacetic, and propionic and salts thereof. Lower pH's than 3 are generally undesirable for oral use. When stannous ions are present, the pH is preferably lower than about 5. The preferred pH range is 3.4 to about 5.0 when stannous ions are present and about 4.5 to about 7.0 in the absence of stannous ions.

The following specific examples are further illustrative of the nature of the present invention but it is understood that the invention is not limited thereto. Dental cream formulations are prepared in the usual manner, except as indicated, and all amounts and proportions are by weight except as otherwise indicated.

EXAMPLE 1

Functional speckles suitable for incorporation into toothpaste bases can be prepared in accordance with the following procedure.

Seventy-four parts of a binding agent having the following properties are heated until molten (about 105°C. to 110°C.) in a suitable vessel having agitator means:

| Chemical identification | non-emulsifiable polyethylene |
|---|---|
| Molecular weight | approximately 1500 |

-continued

| | |
|---|---|
| Softening Point(ASTM E-28) | 102°C. |
| Hardness (0.1mm)(ASTM D-5) | 7.5 |
| Density g/cc(ASTM D-1505) | 0.91 |
| Viscosity cps. 140°C. Brookfield | 145 |

Five parts of a suitable coloring agent, preferably titanium dioxide and 21 parts of stannous fluoride powder is then added to, and thoroughly mixed with, the molten plastic, while the temperature is maintained between about 105° and 110°C. The molten mixture is then poured onto a roll mill including three internally water-cooled rollers spaced 1/32 inch apart, to obtain a plastic film.

The film is cooled to about 50°C. during the milling process and is then broken up into chips. The chips are fed to a solid granulator and are ground to particulate form. The solids granulator can be double roll mill with grooves or a Stokes type granulator with a mesh and rotor. The particulate material is then fed to a sifter having a number 40 mesh (U.S. sieve series) screen and a number 60 mesh (U.S. seive series) screen. The particles retained on the number 40 mesh screen are recycled to the solids granulator for further size reduction and those that pass through the number 60 mesh screen are recycled to the heating-mixing vessel to be remelted. The particles that pass through the 40 mesh screen and are retained on the 60 mesh screen are utilized in the dentifrice formulations of the invention. They are characterized by having an aesthetically pleasing appearance, an irregular physical configuration, and a particle size of from about 250 to about 420 microns.

EXAMPLE 2

Example 1 is repeated using a mixture comprising 90 percent by weight of an oxidized polyethylene having a softening point of about 104°C. and an average molecular weight of about 1800 and about 10 percent by weight of sodium monofluoro phosphate powder.

EXAMPLE 3

Example 1 is repeated using a mixture comprising 70 percent by weight of a polyamide having a softening point of 100°C. and an average molecular weight of between 6000 and 9000 and 30 percent by weight of stannous fluoride powder.

EXAMPLE 4

Example 1 is repeated using a mixture comprising 75 percent of an alpha methyl styrene-vinyl toluene copolymer having a softening point of about 100°C. and an average molecular weight of 1000 and 25 percent by weight of sodium fluoride powder.

EXAMPLES 5 – 8

Examples 1–4 are repeated substituting the antimicrobial agent 1,6-di-p-chlorophenyl biguanidohexane, known in the art as Hibitane in place of the fluoride powder.

EXAMPLE 9

A transparent dentifrice having the following composition is formulated by the usual techniques and entrained air is removed under vacuum:

| Components | Parts |
|---|---|
| Sorbitol (70% solution) | 45.0 |
| Glycerine | 25.0 |
| Sodium carboxymethyl-cellulose | 0.7 |
| Syloid 244 | 5.0 |
| Sodium aluminosilicate | 16.0 |
| Sodium lauryl sulfate | 2.0 |
| Sodium benzoate | 0.5 |
| Sodium saccharine | 0.2 |
| Flavor | 2.0 |
| Water | 3.0 |

The sodium aluminumsilicate employed is a complex having a refractive index of 1.46, a moisture content of about 6 percent, an average particulate size of about 34 millimicrons and a siene loose bulk density of about 0.12g/cc.

Two parts of fluoride containing speckles, produced in accordance with Example 1 are uniformly dispersed in the foregoing formulation. The resulting dentifrice has a very attractive appearance and a fluoride ion content of 0.10 percent by weight. Aging tests for a 6-week period show that this formulation is cosmetically stable and suffers no loss in transparency.

EXAMPLE 10

The formulation of Example 9 is repeated with 5 parts of the fluoride containing speckles of Example 2.

EXAMPLE 11

The formulation of Example 9 is repeated with the fluoride containing speckles of Example 3.

EXAMPLE 12

The formulation of Example 9 is repeated with 5 parts of the fluoride containing speckles of Example 4.

EXAMPLES 13 – 16

The formulation of Example 9 is repeated with the antimicrobial agent containing speckles of Examples 5 – 8.

Although sodium aluminosilicate is a preferred abrasive for incorporation into the gel vehicle, Examples 9–16 can be repeated with similar results using, xerogels such as those available from the Grace Davison Chemical Company under the trademark Syloid 63, 72 and 74, as the abrasive component.

EXAMPLE 17

Functional ingredient containing speckles having an abrasive component and suitable for incorporation into various toothpaste formulations are prepared in accordance with the following procedure: 20 parts of the polyethylene binding agent of Example 1 are dry mixed with 60 parts of zirconium silicate ($ZrSiO_4$) in particulate form having a mean particle diameter of 1 micron, and a Mohs hardness of 8; 20 parts of stannous fluoride powder and 1 part of FD & C Red No. 2 aluminum lake pigment in a suitable vessel. The vessel containing the dry mix is heated in a suitable heating apparatus. The dry mix is stirred while being heated. When the softening point of the binding agent is reached and before the binding agent becomes molten, the vessel is removed from the heating apparatus and cooled while still being stirred. The cooled mass is then ground to particulate form in a blender type apparatus and screened. The fraction passing through a 40 mesh screen (U.S. series)

and retained by a 60 mesh screen is collected for use in accordance with the invention. The collected particles have a distinctive red color, a mean diameter between about 250 and 420 microns and can be advantageously combined with various toothpastes to produce an aesthetically attractive dentifrice having improved polishing characteristics and a water-soluble fluoride ion content of about 0.1 percent by weight.

EXAMPLE 18

Example 17 is repeated using an oxidized polyethylene resin having a softening point of about 104°C. and an average molecular weight of about 1800 as the binding agent.

EXAMPLE 19

Example 17 is repeated using a polyamide resin having a softening point of 110°C. and an average molecular weight of between 6000 and 9000 as the binding agent.

EXAMPLE 20

Example 17 is repeated using an alpha methyl styrene-vinyl toluene copolymer resin having a softening point of about 100°C. and an average molecular weight of 1000 as the binding agent.

EXAMPLE 21

Example 17 is repeated using natural carnauba wax having a softening point between 81°C. and 86°C. as the binding agent.

EXAMPLES 22 – 26

Examples 17-21 are repeated using the antimicrobial agent 1,6,di-(p-chlorophenyl biguanidohexane) diacetate in place of stannous fluoride.

All of the foregoing Examples 17–26 produce functional particles containing abrasive material suitable for incorporation into a variety of toothpaste formulations, including clear gels without impairing the transparency of the formulation. Of course, the color of the particles can be varied by using other suitable coloring materials. The degree of abrasiveness of the speckles can be varied by increasing or decreasing the weight ratio of binding agent to abrasive and by choosing a harder or softer abrasive material.

EXAMPLE 27

The following opaque toothpaste is prepared:

|  | Percent |
|---|---|
| Glycerine (99.3%) | 19.950 |
| Sodium carboxymethyl cellulose | 0.850 |
| Sodium saccharin | 0.200 |
| Sodium benzoate | 0.500 |
| Tetrasodium pyrophosphate | 0.240 |
| Water | 19.986 |
| Trimagnesium phosphate | 0.200 |
| Calcium carbonate | 5.000 |
| Decalcium phosphate dihydrate | 46.550 |
| Sodium N-lauroyl sarcosinate (35%) | 5.714 |
| Flavor | 0.800 |

3 parts of the functional speckles of Example 17 using 20 parts of sodium monofluorophosphate in place of stannous fluoride, are dispersed in the formulation to produce a white cream having a red speckled appearance and improved anticaries characteristics.

EXAMPLE 28

Five parts of the functional speckles of Example 13 are dispersed in the toothpaste base of Example 27. The resulting formulation is a red speckled white opaque cream having improved antimicrobial activity.

EXAMPLE 29

Following the procedures of Example 1, the following functional components are substituted for the fluoride in equivalent amount to form suitable speckles:
  a. strontium chloride,
  b. vancomycin
  c. dextranase
  d. zinc sulphate
  e. saccharin.

The resulting particles are dispersed in the clear and opaque formulations of Examples 9 and 27, to comprise 2 percent by weight of the formulation to form an aesthetically attractive speckled toothpaste having advantageous functional characteristics.

Although the foregoing specific examples include preferred and typical formulations, they should not be taken as limitations on the invention. Accordingly, reference should be made to the following claims in determining the full scope of the invention.

We claim:

1. A macroscopically visible particle having a mean particle size from about 177 to about 840 microns comprising a functional ingredient for promoting hygiene in the oral cavity and an effective amount of a binding agent, said functional ingredient comprising from 1 to 99 percent by weight of said particles and being in the form of subparticles having a size from about 1 to about 20 microns, said functional ingredient being chosen from the group of anticaries agents consisting of water soluble anticaries fluoride salts and anticaries antimicrobial materials, said binding agent being chosen from the group of polyethylenes having a molecular weight from about 1,000 to about 5,000 and a hardness measured as tenths of a millimeter needle penetration (ASTM D 1321) of about 1 to about 15.

2. A macroscopically visible particle having a mean particle diameter from about 177 microns to about 840 microns comprising from about 10 to about 30 percent by weight of a water soluble anticaries fluoride salt and a binding agent, said binding agent being a polyethylene having a molecular weight from about 1,000 to about 5,000 and a hardness measured as tenths of a millimeter needle penetration (ASTM D 1321) of about 1 to about 15.

3. A macroscopically visible particle according to claim 1 having an irregular shape.

4. A macroscopically visible particle according to claim 1 wherein said particles include a coloring agent.

5. A macroscopically visible particle according to claim 4 wherein said coloring agent is titanium dioxide.

6. A macroscopically visible particle according to claim 4 wherein said coloring agent is a metallic lake.

* * * * *